Oct. 19, 1926.
W. H. MILLER
1,604,064
THERMOSTATIC ELEMENT
Filed August 9, 1921
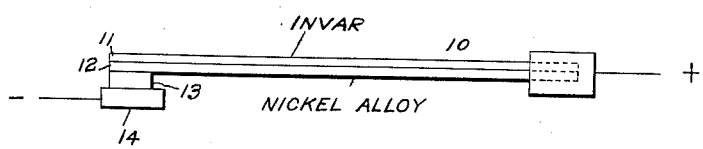
Inventor:
William H. Miller,
by Albert G. Davis
His Attorney.

Patented Oct. 19, 1926.

1,604,064

UNITED STATES PATENT OFFICE.

WILLIAM H. MILLER, OF FORT WAYNE, INDIANA, ASSIGNOR, BY MESNE ASSIGNMENTS, TO THE H. A. WILSON COMPANY, OF NEWARK, NEW JERSEY, A CORPORATION OF NEW JERSEY.

THERMOSTATIC ELEMENT.

Application filed August 9, 1921. Serial No. 491,019.

Brass has frequently been used as one of the two members of a thermostatic element having two members of dissimilar thermal characteristics. Invar has frequently been used as the material for the other member of the thermostatic element. Invar is defined as "a nickel-steel containing about 36 per cent nickel together with about 0.5 per cent each of carbon and manganese, with metallurgically negligible quantities of silver, phosphorus and other elements, the remainder being iron". A thermostatic element made out of brass and invar is not satisfactory for operation at temperatures much above 500 degrees F., because brass at high temperatures gets brittle and the thermostatic element tends to lose its set. Furthermore, an invar-brass element is not saisfactory when used in a thermostatic device which is intended to be responsive to the heating of the thermostatic strip itself by the passage of an electric current therethrough. The brass has a very low electrical resistance as compared to the invar, and the thermostatic strip will not heat up satisfactorily on a current flow, because most of the current will flow through the low conducting brass.

One of the objects of the invention is to provide a thermostatic element which comprises two members having dissimilar thermal characteristics and substantially similar electrical resistance characteristics. In the preferred form, such an element is one which has comparatively high electrical resistance and is satisfactory for use when heated by the passage of an electric current through the element.

Another object of the invention is to provide a thermostatic element which comprises two members of dissimilar thermal characteristics which retain their resiliency and their dissimilar thermal characteristics at comparatively high temperatures. There are many uses for thermostatic metals under conditions such that the metal would be subjected to temperatures running up over 500° F. Also, it is frequently desirable to have the thermostatic metal move an element which imposes a load upon the strip greater than could be borne under the same temperature conditions by the strips heretofore commonly used without substantial loss of accuracy. When a thermostatic strip of the type heretofore usually employed and containing brass as the high expansion element is heated to a relatively high temperature, it assumes a curved configuration by reason of the different expansion coefficients of the two elements; and when the strip is allowed to cool to its original temperature it does not assume its original shape exactly and the difference between its original and final shapes represents loss of accuracy.

This alteration in the original shape of the thermostatic couple is due to the effect of the high temperatures upon the molecular structure of the brass whereby its elastic characteristics are so altered that when the couple is cooled to its initial temperature, it takes a set slightly different from its original one. This permanent set takes place, particularly when the temperature variations run up relatively high, as for instance well over 500° F., under the stresses imposed by the unequal expansion of the two metals and by any working load which the couple may be caused to carry.

I have found that the elastic characteristics and properties of ordinary brass, particularly at temperatures well above 500° F., are such as to render this metal unsuitable for use as the high expansion element in thermostatic couples designed for use under the conditions and for the purpose mentioned. Thus brass in contradistinction to many other alloys, such as alloy steel, does not present the same substantial recovery from the combined effects of stress and high temperature. On the contrary, ordinary brass will take on a substantial permanent set or permanent change in its configuration when subjected to these influences, the change being the more pronounced when the stress and temperature conditions are continued for a substantial period of time.

A good example of a metal which, like brass, has a relatively high expansion coefficient, and which, unlike brass, possesses a much higher resistances to permanent distortion under the combined effects of stress and temperature, is an alloy of nickel differing from invar in its nickel content to an extent sufficient to produce the relatively high expansion coefficient.

Although not necessarily limited thereto, my invention comprises a thermostatic element of invar and a high resistance alloy of nickel, such for instance as a copper-nickel alloy, the alloy having a greater percentage of copper than the percentage of nickel. I have found that the resistance of the composite strip made up of invar and an alloy having substantially 82 per cent copper and 18 per cent nickel has a substantially higher electrical resistance characteristic than a strip of invar and brass and furthermore the strip made of invar and copper nickel alloy will retain its resiliency at high temperatures and the two elements thereof will retain their dissimilar thermal characteristics above 500 degrees F.

For a better understanding of the invention, reference is had to the accompanying drawing and the following description. Referring to the drawing, the thermostatic element 10 is composed of a member 11 of invar or some other high resistance alloy having a substantial percentage of nickel and a member 12 of a high resistance nickel alloy, which has dissimilar thermal characteristics from the member 11. These two members 11 and 12 are suitably joined together so that they form a unitary structure and operate as a unit, and the element carries a switch contact 13 which is adapted to cooperate with a stationary contact 14 in controlling an electric circuit through the element, in a manner well understood by those skilled in the art. Although I have shown the invention as applied in a thermostatic element intended to be heated by the passage of an electric current therethrough, the invention is not necessarily limited to this use, but is applicable generally to thermostatic elements which are intended to be heated in any suitable manner and are adapted to operate a switch contact or any other part which is to be positioned thermostatically. The member 12 of the element has a substantial percentage of nickel, and although the invention is not necessarily limited to this particular alloy of nickel, I have found that the previously mentioned copper-nickel alloy having substantially 82 per cent copper and 18 per cent nickel is satisfactory. A high resistance alloy of nickel such as the material nichrome is also satisfactory.

A thermostatic element constructed in accordance with the invention will retain its resiliency or set at comparatively high temperatures since each of the members is an alloy of nickel which has a comparatively high elastic limit. The two members of the element will have high electrical resistance characteristics, and when the element is heated by the passage of an electric current therethrough, the nickel alloy and the invar will heat up satisfactorily, since the current will divide satisfactorily between the two members. Furthermore, the element as a unit has a high electrical resistance and is thus adapted for use when the element is intended to be heated by the passage of an electric current therethrough, and the members of the element will retain their dissimilar thermal characteristics at high temperatures, for instance, about 500° F. and over.

In accordance with the provisions of the patent statutes, I have described the principle of operation of the invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is:

1. A thermal responsive element having a unitary structure comprising two members having dissimilar thermal characteristics, each of said members composed of an alloy of nickel having a comparatively high elastic limit.

2. A thermostatic element comprising two members having dissimilar thermal characteristics, each of said members composed of an alloy having a substantial percentage of nickel.

3. A thermostatic element comprising a member of nickel steel and a member of a high resistance alloy of nickel.

4. A thermostatic element comprising a member composed of invar and a member composed of a high resistance alloy of nickel.

5. A thermostatic element comprising two members having dissimilar thermal characteristics, one of said members composed of copper nickel alloy having a greater percentage of copper than the percentage of nickel.

6. A thermostatic element comprising two members of dissimilar thermal characteristics, one of said members composed of an alloy having substantially eighty-two per cent copper and eighteen per cent nickel.

7. A thermostatic element comprising a member of invar and a member of a high electrical resistance alloy having a substantial percentage of nickel and a dissimilar thermal characteristic to the invar member, the said members retaining their dissimilar thermal characteristics at 500 degrees Fahrenheit.

8. A thermostatic element comprising a member of invar and a member composed of a copper nickel alloy.

9. A thermostatic element comprising a member of invar and a high resistance member composed of an alloy having substantially eighty-two per cent copper and eighteen per cent nickel.

10. A thermostatic couple consisting of two elements having different coefficients of expansion fused together, both elements consisting of alloys of nickel.

11. A thermostatic couple consisting of two elements fused together, one having a relatively low temperature coefficient and being composed of a nickel-steel alloy, and the other having a relatively high temperature coefficient and being composed of a nickel alloy.

12. A thermostatic couple consisting of two elements fused together, one composed of a nickel-steel alloy having a low expansion coefficient and the other composed of a nickel-copper alloy having a relatively high expansion coefficient.

In witness whereof, I have hereunto set my hand this 6th day of August, 1921.

WILLIAM H. MILLER.